Dec. 6, 1960    H. E. TRACY    2,963,306
MECHANICAL SEAL ASSEMBLY
Filed Oct. 12, 1956
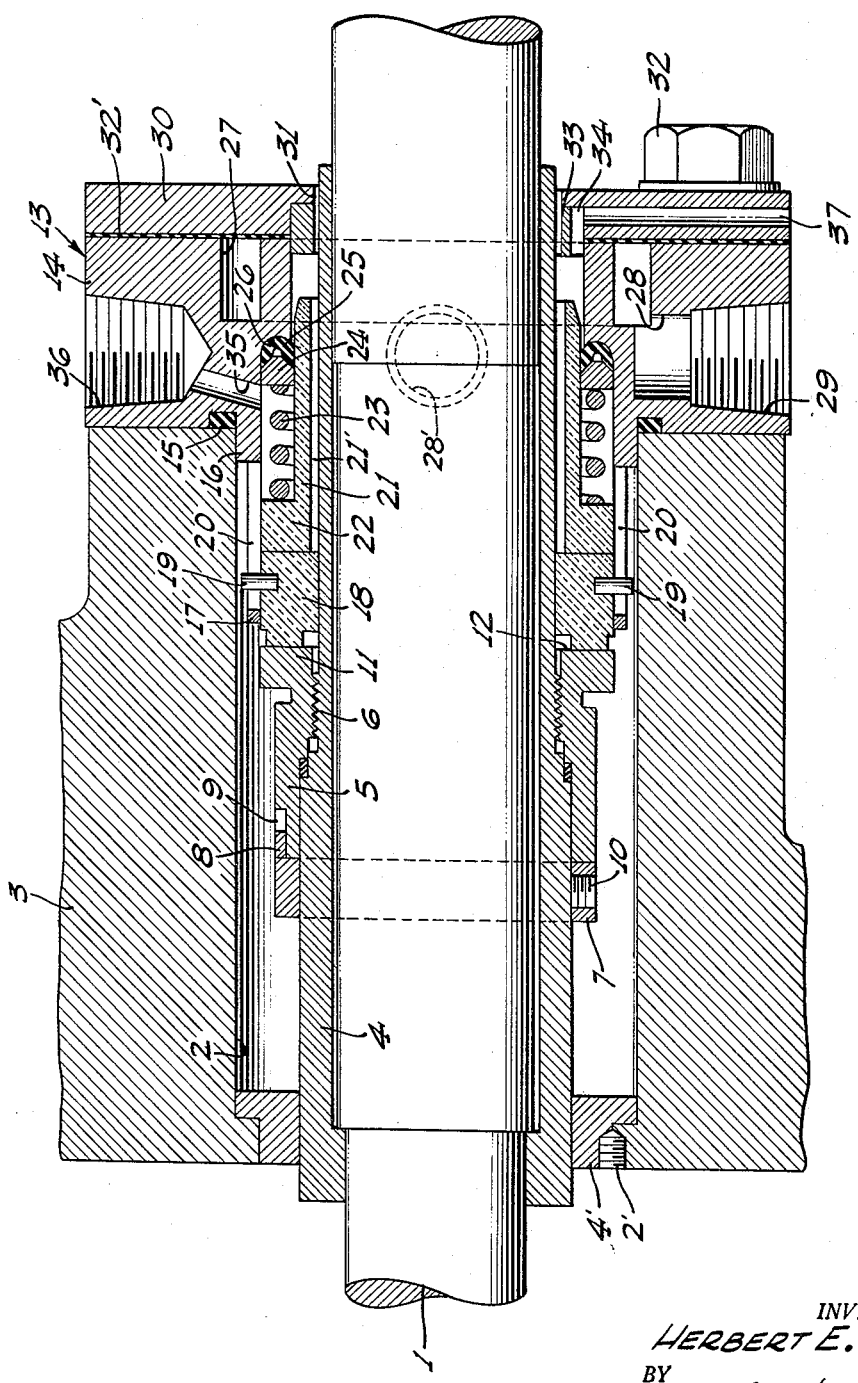
INVENTOR.
HERBERT E. TRACY
BY
ATTORNEY United States Patent Office 2,963,306
Patented Dec. 6, 1960

2,963,306

MECHANICAL SEAL ASSEMBLY

Herbert E. Tracy, Alhambra, Calif., assignor to Borg-Warner Corporation, Chicago, Ill., a corporation of Illinois Filed Oct. 12, 1956, Ser. No. 615,518

9 Claims. (Cl. 286—8)

The present invention relates to mechanical seals, and more particularly to a mechanical seal assembly adapted for use in installations where the seal assembly is subjected to relatively high temperatures, but which is not limited to such installations since it may also be advantageously employed in installations where no high temperatures are encountered.

In lieu of the shaft packing which has previously been commonly employed to seal a pump casing against leakage along a rotatable pump shaft, various types of mechanical seal assemblies have been devised, with attendant reductions in friction on the shaft, leakage and maintenance problems. Such mechanical seals generally employ a plurality of relatively rotatable sealing elements having their contacting faces lapped to an extremely highly polished finish. Ordinarily, at least one of the sealing elements is fixed against rotation, and another of the sealing elements is mounted on the shaft or on a shaft sleeve for rotation therewith, while one of the sealing elements is mounted and loaded for axial movements towards the complemental sealing element to maintain sealing contact between their contiguous faces and to take up wear, as it occurs, thus providing a long-lasting leakproof seal structure.

In the aforementioned type of mechanical seal assembly, the necessity for supplemental sealing gaskets or cups is not entirely avoided. Supplemental sealing means, such as a spring-pressed rubber, neoprene, composition, asbestos or other cup or ring must be employed to prevent loss of fluid past the mechanical sealing members. However, even such material as asbestos will not stand up as a supplemental seal member in installations where high temperatures on the order of 800° F. are encountered.

Accordingly, a primary object of the present invention is to provide a novel mechanical seal construction wherein the components are so constructed and combined that the seal assembly is eminently suited for use in installations where high temperature is a problem.

Another object is to provide such a mechanical seal assembly wherein the supplemental sealing member is remotely located with respect to the source of heat and wherein the supplemental sealing member is protected against exposure to dangerously high temperatures, such as might otherwise destroy the supplemental seal.

A further object is to provide a mechanical seal assembly in accordance with the foregoing objectives, including a flange adapted to be mounted on the pump casing exterior and to encircle the pump shaft, a mechanical sealing sleeve element extending through said flange in spaced relation to the shaft and providing an air gap to reduce the conduction of heat from the shaft to the seal sleeve, with the supplemental seal element as aforesaid interposed between the seal sleeve and the flange, said flange having a cooling jacket through which a coolant can be circulated, thus maintaining at a minimum elevation of the temperature of the supplemental seal. This entire structure is located externally of the pump casing and as remotely as possible from the sources of heat.

In addition, the flange may be provided with a fluid inlet for supplying a flushing and/or lubricating fluid to the sealing elements to protect them from the deleterious effects of abrasives or other harmful materials which might otherwise reduce the life of the seal.

Other objects and advantages will be hereinafter described or will become apparent to those skilled in the art, and the novel features of the invention will be defined in the appended claims.

In the drawing:

The figure is a view in section taken axially through a mechanical seal assembly made in accordance with the invention.

Like reference characters in the drawing and in the following description designate corresponding parts.

In the present illustrative embodiment, the novel seal assembly hereof is shown in association with a rotatable shaft 1 of a pump, said shaft 1 extending through a chamber 2 in the pump casing 3, and said chamber 2 being adapted to ordinarily contain packing means for sealing engagement about the shaft 1.

The operation of such packing means, particularly in installations where relatively high temperatures on the order of 800° F. are encountered is not very satisfactory. Accordingly, the mechanical seal assembly of the invention is employed in lieu of such conventional packing means.

In this connection, a shaft sleeve 4 is mounted upon the shaft 1 for rotation therewith. At its inner end, the sleeve 4 is journaled in a bearing 4' which is secured in place as by means of a pin or screw 2' engaged with the bearing 4' and the casing 3. About midway of the sleeve 4, a mechanical sealing element 5, in the form of a collar or sleeve, is threadedly connected to the sleeve 4, as at 6, and secured in place by a locking ring 7 having a tang or projection 8 projecting into a notch 9 in the outer periphery of the element 5, this locking ring 7 being fixed on the sleeve 4 as by means of a set screw 10 or the like. At its outer end, that is, the right hand end as seen in the figure, the sleeve or element 5 is provided with a radially disposed annular sealing flange 11 having a sealing face 12 which is lapped to a fine finish. Thus the sleeve or collar 5 constitutes a sealing element which is fixed against axial movement, but which is rotatable along with the sleeve 4.

The shaft sleeve 4 is preferably extended outwardly of the casing 3, and encircling the outer extremity of the shaft sleeve 4 is a unitary sub-assembly generally designated 13.

This sub-assembly 13 comprises an annular housing flange 14 which encircles the shaft sleeve 4 in spaced relation thereto and which is in abutting contact with the outer face of the casing 3, with a sealing ring or gasket 15 interposed between the abutting faces of the housing flange 14 and casing 3. Preferably the abutting faces just referred to are machined to provide a good surface contact therebetween. For locating the flange 14 with relation to the casing 3, the flange 14 is provided with an axially extended annular hub 16 which projects into the open end of the chamber 2 and closely fits therein. The hub 16 is provided with an annular axial extension 17 projecting towards the sealing member 5 and encircling the shaft sleeve 4 in spaced relation thereto.

Disposed in the space between the hub extension 17 and the shaft sleeve 4 is an axially shiftable mechanical sealing ring 18, this ring 18 carrying a suitable number of radially projecting pins 19 which are adapted to project through a like number of axially extended slots 20 through the extension 17, thus keying the ring 18 to the extension 17 so as to prevent rotation of the sleeve 18.

This sleeve 18 is preferably composed of carbon material and is provided with a lapped sealing face at one end engageable with the sealing flange 11 to prevent the passage of fluid therebetween.

In order to urge the sealing ring 18 into sealing contact with the flange 11, a sealing sleeve element 21 is also provided, this sleeve 21 having a radial enlargement 22 at its inner end, said enlargement being provided with a lapped face engageable with a complemental lapped face on the sealing ring 18. The inside diameter of the sealing sleeve 21 is larger than the outside diameter of the shaft sleeve 4, so that an intervening air space 21' is provided between these two sleeves, and the sealing sleeve 21 is concentrically located and slidably retained in position by engagement of the outer periphery of the enlargement 22 with the inner periphery of the hub extension 17.

Means are also provided for resiliently biasing the previously described sealing elements into sealing contact with one another, and this means preferably comprises a coiled compression spring 23 which encircles the sealing sleeve 21 in the space between the housing flange unit 14 and the sleeve 21, this spring 23 seating at one end on the radial enlargement 22 on the sleeve 21 and being engageable at its other end with an expander ring 24 which is adapted to expand a flexible sealing ring or cup 25 into engagement with the outer periphery of the sleeve 21, this cup 25 serving to prevent leakage of fluid between the flange 14 and the sleeve 21. In addition, the flange 14 is provided with an annular seat 26 for accommodating the sealing cup 25.

According to one of the salient features of the invention, means are provided for circulating a cooling fluid through the housing flange 14 so as to maintain the temperature of the flange adjacent to the sealing cup 25 at a substantially reduced temperature, as compared with the temperature to which the structure is subjected when, for instance, the shaft 1 is a pump shaft, and the pump is pumping relatively high temperature fluids. Accordingly, the outboard side of the housing flange 14 is channeled or grooved as at 27 to provide a cooling jacket having an inlet port 28, this inlet port 28 being tapped at 29 to accommodate a fitting. As is obvious, a second port or outlet 28' is also provided so as to enable fluid circulation through the channel 27. The coolant jacket or channel 27 is located in close proximity to the cup 25 so as to substantially cool the cup.

At the outboard side of the housing flange 14, a closure or end plate 30 of annular form encircles the outer extremity of the shaft sleeve 4 in slightly spaced relation to the sleeve 4, so as to provide an air gap 31. A suitable number of screws or other suitable fasteners 32 extend through the end plate 30, the housing flange 14 and into the casing 3, thus firmly clamping the housing flange 14 between the casing 3 and the end plate 30, and a sealing gasket 32' is preferably interposed between the plate 30 and flange 14.

A brass bushing 33 is preferably interposed between the outer extremity of the pump sleeve 4 and the flange 14 and end plate 30 in the vicinity of their abutting faces, this bushing 33 being slightly spaced from the shaft sleeve 4 to permit the passage of air through the clearance space 31 and into the air space 21' between the seal sleeve 21 and the shaft sleeve 4, thus further providing for a reduction in the temperature adjacent to the sealing cup 25. This brass bushing also aids in preventing flashing in the event that a volatile material is being pumped.

In the event that abrasive or other materials harmful to the mechanical sealing elements are being pumped, the flange 14 is preferably provided with a port 35 through which a flushing or lubricating fluid may be admitted to the chamber 2 to maintain the sealing elements free of such harmful material. The flange 14, under such circumstances, is tapped as at 36 to receive a connector for a flushing fluid conduit.

It will be observed that the flange 14, together with the end plate 30, the sealing sleeve 21, and the sealing ring 18 constitute a unitary sub-assembly which is applicable as such to the shaft sleeve 4.

In operation, pump or other fluid entering the chamber 2 will encounter the cooperative, relatively rotatable mechanical sealing surfaces between the sealing ring 18 and the flange 11 of the collar 5, and will also encounter the cooperative sealing faces between the sealing ring 18 and the end 22 of the seal sleeve 21; thus the passage of such fluid through the seal structure and along the shaft will be precluded. In addition, the sealing cup 25 will prevent the passage of the pump or other fluid between the outer periphery of the seal sleeve 21 and the housing flange 14. But in the event that any fluid succeeds in passing these seals, the end plate 30 is preferably provided with a drain passage 37 extending radially downwardly therethrough and communicating with at least one of a suitable number of ports 34 extending through the bushing 33 at its outer periphery.

The sealing ring 25 may be composed of any suitable material, depending upon the nature of the fluid to which it will be subjected. However, when the seal assembly is utilized in an installation where it is subjected to relatively high temperatures, say on the order of 800° F., the sealing ring 25 is preferably composed of asbestos or other heat-resistant material. Even asbestos will not stand up as a seal under such elevated temperatures, but as a result of the improved construction previously described, the temperature to which the sealing cup 25 is subjected when the mechanical sealing faces are subjected to temperatures of about 800° F. is maintained at something under 650° F., thus substantially enhancing the life of the cup 25.

In the light of the foregoing, it will now be apparent that a novel structural relationship exists, since the sealing cup 25 is located substantially as remotely as possible from the ource of fluid entering the chamber 2 and closely adjacent to the cooling jacket 27. In addition, the air gap 21' between the seal sleeve 21 and the shaft sleeve 4 further reduces the conduction of high temperatures to the sealing cup 25. Accordingly, the seal assembly will remain operative for relatively long periods of time as compared with prior seal constructions wherein the sealing means for preventing the leakage of fluid past the mechanical sealing elements are not cooled as herein disclosed.

While the specific details have been herein shown and described, changes and alterations may be resorted to without departing from the spirit of the invention as defined in the appended claims.

I claim:

1. An assembly of the class described, comprising a rotatable shaft and a casing having a chamber, a shaft projecting from said casing through said chamber, a flange encircling said shaft in spaced relation thereto and secured to said casing, means disposed in said chamber including a plurality of relatively rotatable mechanical sealing elements for preventing the flow of fluid out of said casing along said shaft, one of said mechanical sealing elements including a sleeve encircling said shaft and extending from the chamber into the space between said flange and said shaft, a packing ring interposed between said sleeve and said flange for preventing the flow of fluid out of said casing along said sleeve, and said flange having a passage extending circumferentially therein closely adjacent to said packing means in spaced relation to said sleeve and isolated from the aforesaid space, said flange having inlet and outlet means communicating with said passage for circulating a cooling fluid through said passage.

2. A seal assembly as defined in claim 1, including a coiled spring means encircling said sleeve for urging the mechanical sealing element having said sleeve axially toward the adjacent mechanical sealing element, said flange having a seat therein, and said packing ring between the flange and said sleeve being disposed in said seat, with said spring means engaging the latter packing ring to retain the packing ring in place in said seat.

3. A seal assembly as defined in claim 1, including a coiled spring encircling said sleeve for urging the mechanical sealing element having said sleeve axially toward the adjacent mechanical sealing element, said flange having a seat therein, and said packing ring between the flange and said sleeve having the form of a cupped sealing washer disposed in said seat, and an expander ring in said cupped sealing washer, with said spring engaging the expander ring to expand the cupped sealing washer and retain it in place in said seat.

4. A seal assembly for effecting a seal between a rotatable shaft and a casing through which the shaft projects, comprising a mechanical seal disc mounted on said shaft for rotation therewith and within said casing, a cooperative assembly comprising a flange having a hollow cylindrical extension projecting into said casing and encircling said shaft in spaced relation thereto, a mechanical sealing disc axially shiftably carried by said extension and keyed to said extension to prevent rotation of the latter sealing disc, said sealing discs having their opposed faces lapped for cooperative sealing contact, a sealing sleeve encircling said shaft in spaced relation thereto and concentrically disposed within said flange and said extension, said sleeve having a radial enlargement at one end adapted for engagement with said non-rotatable disc, said latter disc and said enlargement having cooperative lapped sealing surfaces, a sealing cup encircling said sleeve and engaged with said flange, resilient means interposed between said sealing cup and said enlargement for expanding said cup and for urging said sleeve towards the sealing disc on the shaft to press the non-rotatable disc therebetween, a coolant passage in said flange, said flange having inlet and outlet means for circulating a coolant in said passage, and means securing said flange to said casing.

5. A seal assembly as defined in claim 4, wherein the securing means for said flange includes an end plate, said coolant passage being an open channel formed in said flange, said end plate overlying said channel to close the same, and fastener means extending through said end plate and flange into said casing.

6. A seal assembly as defined in claim 4, wherein the securing means for said flange includes an end plate, said end plate encircling said shaft in spaced relation thereto and providing an air gap to admit atmosphere into the space between said sealing sleeve and the shaft.

7. A seal assembly for effecting a seal between a rotatable shaft and a casing through which the shaft projects, comprising relatively rotatable mechanical sealing means operatively connected to said shaft and to said casing to prevent the flow of fluid out of said casing along said shaft, said mechanical sealing means including a sleeve encircling said shaft in spaced relation thereto and providing an air gap therebetween, said sleeve projecting axially out of said casing, a sealing ring encircling said sleeve exteriorly of said casing, a flange fixedly mounted on said casing and having a seat in which said sealing ring is disposed, said flange also having an open channel and an end plate secured to said flange and overlying said channel to form a coolant passage extending circumferentially therein and closely adjacent to but isolated from said seal seat, and means for allowing a coolant to be circulated through said passage.

8. In a seal assembly for effecting a seal between a rotatable shaft and a casing through which the shaft projects, comprising: a mechanical seal disc mounted on said shaft within said casing for rotation with said shaft; a cooperative sealing assembly secured to said casing about said shaft and including a flange having a hollow cylindrical extension encircling said shaft in spaced relation thereto and extending into said casing; mechanical sealing means axially shiftably carried by said extension, keyed to said extension to prevent relative rotation thereof and disposed in sealing relation to said seal disc; said mechanical sealing means including a sealing sleeve encircling said shaft in spaced relation thereto and concentrically disposed within said flange and said cylindrical extension; a packing ring encircling said sleeve and engaged with said flange; resilient means interposed between said packing ring and said mechanical sealing means for urging said packing ring into engagement with said flange and for urging said mechanical sealing means towards said seal disc; said flange having a coolant passage extending circumferentially therein closely adjacent to but isolated from said packing ring, and said flange also having inlet and outlet openings communicating with said passage to permit the circulation of a coolant therethrough.

9. A mechanical seal assembly adapted to be secured to a housing about a shaft having a radially extended seal disc thereon to prevent the leakage of fluid from said housing, comprising: an annular flange having an axially extended hollow cylindrical extension; mechanical sealing means adapted to cooperate with said seal disc and including a sealing ring non-rotatably keyed to said extension for axial movement relative thereto; said sealing ring having a radially disposed face adapted to be opposed to the seal disc aforesaid and a second radially disposed face; an elongated sealing sleeve shiftably disposed within said flange and said extension and having a radial enlargement at one end provided with a radial face opposed to said second face of said sealing ring; a packing ring interposed between said flange and said sealing sleeve; a spring interposed between said packing ring and said radial enlargement for biasing said sleeve towards said sealing ring and for expanding said packing ring; said flange having an open channel therein and inlet and outlet ports communicating through said flange with said channel; and a closure plate on said flange overlying said channel to form a closed coolant passage lying closely adjacent to but isolated from said packing ring through which a coolant may be circulated.

References Cited in the file of this patent

UNITED STATES PATENTS

| | | |
|---|---|---|
| 2,419,588 | Pasco | Apr. 29, 1947 |
| 2,479,236 | Hanson | Aug. 16, 1949 |
| 2,567,809 | Greiner | Sept. 11, 1951 |
| 2,677,328 | Vitek | May 4, 1954 |

FOREIGN PATENTS

| | | |
|---|---|---|
| 506,524 | Great Britain | May 30, 1939 |
| 685,913 | Great Britain | Jan. 14, 1953 |